(12) United States Patent
Ishii et al.

(10) Patent No.: US 7,675,836 B2
(45) Date of Patent: Mar. 9, 2010

(54) RECORDING/REPRODUCING APPARATUS WITH DOUBLE-SIDED BEAM TYPE PROBE

(75) Inventors: Mieko Ishii, Tsuchiura (JP); Takeshi Harada, Abiko (JP); Youichi Inoue, Ryugasaki (JP); Kenchi Ito, Cambridge (GB)

(73) Assignee: Hitachi, Ltd., Tokyo (JP)

( * ) Notice: Subject to any disclaimer, the term of this patent is extended or adjusted under 35 U.S.C. 154(b) by 1229 days.

(21) Appl. No.: 11/170,085

(22) Filed: Jun. 30, 2005

(65) Prior Publication Data
US 2006/0002272 A1    Jan. 5, 2006

(30) Foreign Application Priority Data
Jun. 30, 2004   (JP)   ............................. 2004-192985

(51) Int. Cl.
    *G11B 7/00*    (2006.01)
(52) U.S. Cl. .................... 369/126; 369/44.11; 369/47.1
(58) Field of Classification Search .................. None
    See application file for complete search history.

(56) References Cited

U.S. PATENT DOCUMENTS

| 4,831,614 | A  | * | 5/1989  | Duerig et al. ................ 369/101 |
| 4,998,016 | A  | * | 3/1991  | Nose et al. .................... 250/306 |
| 5,053,995 | A  | * | 10/1991 | Kajimura et al. ............. 369/126 |
| 5,418,771 | A  | * | 5/1995  | Kasanuki et al. ............. 369/126 |
| 7,042,669 | B2 | * | 5/2006  | Ogawa et al. ................... 360/55 |
| 2004/0125733 | A1 | * | 7/2004 | Lee et al. ...................... 369/101 |
| 2005/0128886 | A1 | * | 6/2005 | Ogawa et al. ............. 369/13.33 |

FOREIGN PATENT DOCUMENTS

| JP | 08-115600 | 5/1996 |
| JP | 09-120593 | 5/1997 |

* cited by examiner

*Primary Examiner*—Muhammad N. Edun
(74) *Attorney, Agent, or Firm*—McDermott Will & Emery LLP

(57) ABSTRACT

For providing a recording/reproducing apparatus, for recording/reproducing information through conduction of electricity upon contact of a probe, having large recording density and a large transfer speed, but less in deterioration of a probe chips thereof, and being long in the lifetime thereof, within the recording/reproducing apparatus, a multi-chip is formed, disposing probe chips in large numbers thereof at a tip of a cantilever, while the cantilever is of a double-sided beam type, and the multi-chip is disposed at a center of the beam, wherein recording/reproducing portions of the multi-chip are disposed to correspond to recording dots one by one, and the multi-chip forming surface is moved up and down in parallel with the surface of a recording medium, due to suction force, so as to bring it to be in contact with the recording dots, and electricity is conducted after the contact thereof, thereby conducting the recording, in the structure; wherein, since a large amount of data can be read/written at one time, therefore it is possible to improve data transfer speed. Also, with conducting the R/W by means of the multi-chip, comparing to the single chip, it is possible to reduce the traveling distance of the multi-chip, thereby to reduce the abrasion. Also, since the tip portion of the said chip has the curvature radius, being large, such as, equal to 50 nm or greater than that, and since it moves in parallel with the surface of the recording medium, it can be in contact with the surface under the condition of, not the point contact, but near to the plane contact, therefore, the abrasion can be further reduced, effectively.

10 Claims, 14 Drawing Sheets

WIRING VIEW IN VICINITY OF
MULTI-CHIP PORTION

RECORDING/REPRODUCING APPARATUS WITH DOUBLE-SIDED BEAM TYPE PROBE

BACKGROUND OF THE INVENTION

The present invention relates to a recording/reproducing apparatus for conducting recording or reproducing, in particular to that enabling to record a large amount or volume of data information, etc., at super-high density.

In communication systems and/or computer networks, etc., within an advanced information-oriented society in recent years, an amount of data increases rapidly, every year, to be used in the computers, in particular, accompanying with the widely broadening of the Internet broadband. And, accompanying with this, requirements also rise up, quickly, in particular, for the recording/reproducing apparatuses of large capacity and at high speed thereof.

As the technology for achieving the recording of data at high density, also being random-accessible, in relation to the conventional art, there are already known the followings; such as, a magnetic recording, an optical recording, and a semiconductor memory, etc., for example. In the field of the semiconductor memory, integration is improved in the degree thereof, every year; however, because of the problems, such as, the manufacturing technology or the like, for example, a semiconductor memory cannot be obtained, yet, that can satisfy the requirement of such large recording capacity of data (i.e., being equal or greater than 3 GB).

Also, in the magnetic recording and the optical recording, for achieving the information recording of such the large amount or capacity thereof, it is necessary to narrow a recording area to be small, so as to increase the recording density thereof. In the magnetic recording, an increase of recording density is remarkable due to the development of the magnetic head of GMR (Gigantic Magnetic Resistance effect), etc., but because of the problem on sensitivity of the reproducing head, it is difficult to obtain a unitary recording area being equal or less than 100 nm. Also in the optical recording, even if developing a semiconductor laser of wavelength 500 nm, for example, but it is a limit of diffraction of a light; therefore, it is said that the recording area being equal or less than 100 nm cannot be achieved.

On the other hand, developments are made on a scanning-type tunnel microscope (hereinafter, "STM") and/or an atomic force microscope (hereinafter, "AFM"), having spatial resolution of level of atoms and molecules, and they are applied in various analyses on fine structures; i.e., being utilized widely as a surface analyzing apparatus. In particular, the AFM is developed to be a scanning-type probe microscope (hereinafter, "SPM"), using various kinds of physical quantities as a probe, in recent years, and lately, various studies are made upon the possibility of realization of a recording/reproducing apparatus with using those means; i.e., as a means for accessing to atoms and molecules.

In the recording/reproducing apparatus with using a cantilever, to be used in the AFM or the like, as is described in the following Patent Document 1, for example, information is recorded and/or deleted due to charge transfer or reversal of electric polarization within a predetermined area on surface of the recording medium, through applying voltage by means of a head, which is made from a stylus-like electrode. And, reproduction of information recorded in this predetermined area is performed, by detecting an amount of change on the electric charge, the electrostatic charge or the surface potential, or alternately, the differentiated amount of change thereof, under the condition that the head is in non-contact with the recording medium, with an aid of a frequency change, which is caused at the time when the cantilever is vibrated while applying voltage between the cantilever and the recording medium. Since the information can be reproduced under the condition of non-contact, in this manner, therefore, the head of the stylus-like electrode and/or the recording medium can be escaped or protected from abrasion, i.e., being worn away.

Also, when writing or recording is done by only one (1) piece of the cantilever covering over an area of a wide region, then the abrasion of the cantilever proceeds very quickly, and therefore, for the purpose of preventing it, there is already known a technology, as is described in the following Patent Document 2, for example. Thus, a probe (i.e., the cantilever), a W (Write)/R (Read) circuit, a prove driver circuit and a positioning circuit, etc., are formed in one body, in the form of a probe cell, through a monolithic semiconductor process, and the cells are provided in large numbers thereof (for example, 100,000 pieces) for each one of the memory devices. Provision of the large numbers of cells, in this manner, increases up an amount of the information of read-out or write-in, remarkably, per a unit of time, as well as, reducing the traveling distance when reading and writing per one (1) piece of the probe; thereby, enabling to reduce the abrasion of the probes (i.e., the cantilevers) and obtaining a long life-time of the apparatus as a whole.

Patent Document 1: Japanese Patent Laying-Open No. Hei 9-120593 (1997)

Patent Document 2: Japanese Patent Laying-Open No. Hei 8-115600 (1996)

However, in case of the conventional art, as is described in the Patent Document 1 mentioned above (i.e., Japanese Patent Laying-Open No. Hei 9-120593 (1997)), the voltage must be equal or greater than a certain level thereof for achieving the read-in, in particular, when detecting the amount of change of the electric charge, the electrostatic charge or the surface potential, or alternately the differentiated amount of change thereof, under the condition that the stylus-like electrode head is in non-contact with the recording medium, with an aid of a frequency change that is caused at the time when the cantilever is vibrated while applying voltage between the cantilever and the recording medium; however, sufficient consideration is not paid, in particular upon a possibility that the discharge phenomenon occurs from the tip of cantilever to the recording medium at that time, because of being in non-contact therewith, on the contrary thereto, and thereby generating breakdown at the tip of the cantilever, or on the surface of the recording medium; i.e., reducing the reliability thereof. And also, since the cantilever is an electrode of the stylus-like shape, the tip of the cantilever is in contact with the recording medium at a point (i.e., a point contact); therefore, there is another problem that the abrasion can advance, easily.

Also, in case of the conventional art, as is described in the Patent Document 2 mentioned above (i.e., Japanese Patent Laying-Open No. Hei 8-115600 (1996)), with the probe cells, in each of which the probe (i.e., the cantilever) is formed with the W/R circuit, the probe driver circuit and the positioning circuit, etc., corresponding thereto, in one body as a probe cell, it is possible to reduce ill influences due to noises, because stray capacity of wirings can be made small; however, on the other hand thereof, because all of the probe cells must include therein, the W/R circuit, the probe driver circuit and the positioning circuit, etc., then the electric power necessary for all of the probe cells also increases in proportion to the number of those probe cells; i.e., there is a necessity of electric power of a very large amount or quantity thereof. This may results in a possibility of causing a very important obstacle thereto, in particular, when taking a tendency of energy saving and/or mobilization of the apparatus as a whole into the consideration.

BRIEF SUMMARY OF THE INVENTION

An object, according to the present invention, for dissolving such the problems as were mentioned above, is to provide a method for obtaining a long lifetime of an apparatus as a whole, wherein a multi-chip probe, disposing only the heads mentioned above in plural numbers thereof, is disposed in the place of the said one (1) piece of cantilever, so as to read/write a large number of data, at one time, by means of the one (1) piece of the multi-chip probe; whereby achieving high speed of data transfer velocity per a unit of time, as well as, reduction of the abrasion in the cantilever portion, and also to improve the reliability of the recording/reproducing apparatus, according to the present method.

The followings are brief explanations, which will be made about representative ones of the inventions disclosed in the present application:

The object mentioned above, according to the present invention, is accomplished by a recording/reproducing apparatus, comprising a cantilever having a probe chip at a tip thereof, for performing conductive recording by changing resistance or the like of a recording medium, while bringing said cantilever to be in contact with a portion of forming a recording-dot on a recording medium, so as to provide current or voltage thereto, wherein a multi-chip is made up with providing the probe chips at the tip of said cantilever in large numbers thereof, while being dispose at a center of said cantilever that is a beam of center impeller type or double-sided beam type, and said multi-chips is disposed corresponding to said recording dot portions, one by one, and at the same time, the cantilever portion is moved up and down due to suction force (i.e., the Coulomb force, etc.) with keeping the multi-chip forming surface thereof to be in parallel with the recording medium surface, so as to bring each the multi-chip into contact with the dot portion corresponding thereto and thereafter to turn on electricity thereto, thereby to perform recording.

Also, since the chip end portion and the dot tip portion move up and down under the condition of being in parallel to the surface of the recording medium, it is possible to bring them to be in contact with each other, in the form being near to a face or plane contact; therefore, the contact pressure can be lowered, and the abrasion can be reduced, effectively.

Also, with determining the curvature radius of the chip end to be equal or larger than 50 nm, for example, it is possible to reduce the abrasion, effectively, comparing to that of the conventional chip being equal or less than 20 nm.

Also, with determining the suction force (i.e., the Coulomb force, etc.) to be appropriate, depending upon the spring constant of the each cantilever, it is possible to make the pressure applying between the chip end portion and the dot tip portion at the minimum, and thereby enabling to further reduce the abrasion, effectively.

Further, changing the single chip into the multi-chip enables to read/write a large amount of data, at one time, and thereby increasing the data transfer velocity. Moreover, comparing to the single chip, since the multi-chip enables to reduce the scanning or traveling distance thereof, then the abrasion when moving can be also reduced, effectively, in proportional to the traveling distance.

As was mentioned above, within such the structure, wherein the multi-chip is made up with disposing the probe chips at said cantilever tip in large numbers thereof, to be disposed at a center of said cantilever that is the beam of center impeller type or double-sided beam type, while disposing the recording/reproducing portions of said multi-chips corresponding to said recording dot portions, one by one, and at the same time, the cantilever portion is moved up and down through suction force, such as, the Coulomb force, etc., with keeping the multi-chip forming surface thereof to be in parallel with the surface of the recording medium; therefore, it is possible to reduce the abrasion at the contact portion (s), and to obtain a long lifetime of the apparatus as a whole.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 15:
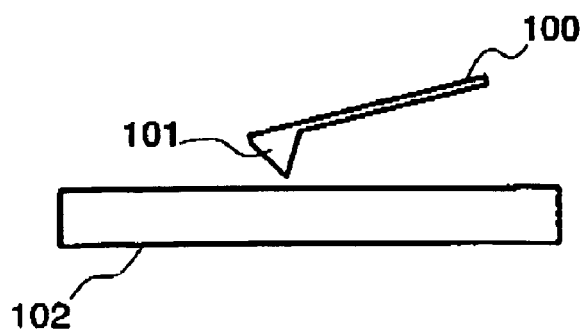
FIG. 15 is an explanatory view for showing a recording/reproducing portion of the conventional recording/reproducing apparatus.

FIG. 15 shows an example of the recording/reproducing apparatus, using the conventional cantilever 100 therein. In the structure of the recording/reproducing apparatus using the cantilever therein, which is adopted into the conventional AFM, etc., the cantilever 100 of one-sided type having a single chip 101, as is shown in FIG. 15, is in contact with a recording medium, to apply voltage thereto, thereby recording thereon and/or deleting therefrom, due to causing charge transfer or reversal of electric polarization within a predetermined area on the recording medium. In case when recording the information with using such the one-sided type cantilever, since the cantilever 100 is in contact with the recording medium 102 due to rotational movement of the beam, then the contact portion between the beam and the recording medium comes to be, so-called a point contact. Accordingly, high pressure is applied onto that portion, and therefore it is the structure, within which the abrasion can proceed or advance, easily. Also, since reading/writing of information is conducted, widely covering over a wide area or region, by only one (1) piece of the cantilever 100, therefore, the abrasion of the cantilever can proceed very quickly. Further, if setting the velocity of the cantilever to be high speed, and also the abrasion speed goes up to be high; therefore, it is difficult to conduct the reading/writing at high speed, i.e., there is a problem that the transfer speed cannot be increased, etc.

For escaping from such the problem, conventionally, many patent applications were made in relation with a method, such as, with which the cantilevers and/or the probe cells are disposed within the apparatus in large numbers thereof, for the purpose of increasing the transfer speed thereof, as is shown the Japanese Patent Laying-Open No. Hei 9-120593 (1997) and the Japanese Patent Laying-Open No. Hei 8-115600 (1996), for example. However, an area where one (1) piece of the cantilever or the probe cell can be provided is considered to be 10 um squares at the lowest limit, from a viewpoint of manufacturing thereof. Accordingly, it can be considered that the large numbers of the cantilevers cannot be disposed within an area of the size or less than that.

On the other hand, when trying to transfer the large amount of data at further higher speed, there is a necessity of such the structure that the large amount of data can be recorded/written, at once, at the cantilever portion that conducts the recording/writing. According to the present invention, accomplished for dissolving such problems as were mentioned above, there is provided a recording/reproducing apparatus, having a multi-chip of the double-sided beam type therein, wherein the chip end portion is hardly worn away, and further a large amount of data can be processed at one time. Hereinafter, explanation will be given about the details of the present invention.

Figure 1:
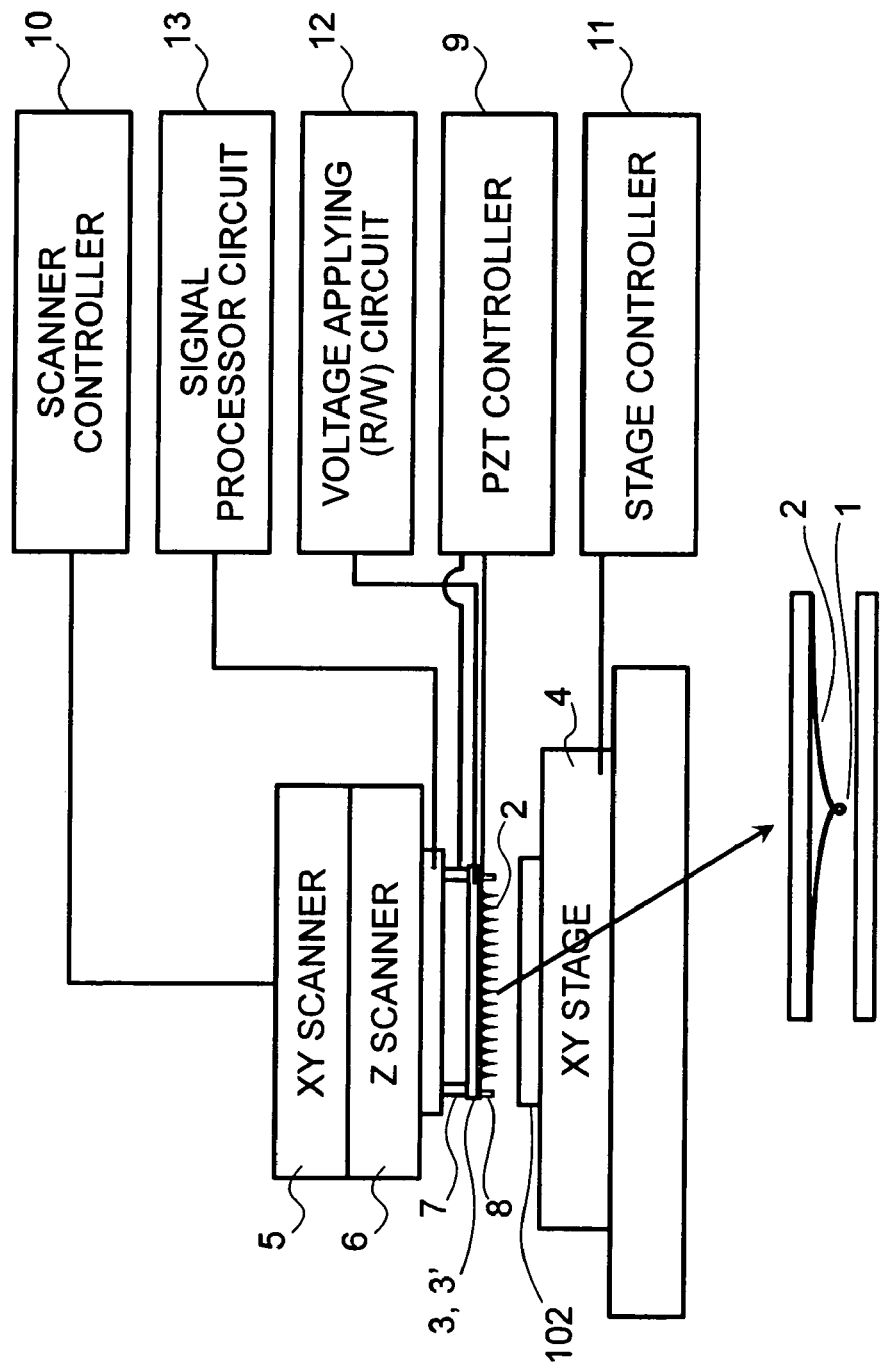
FIG. 1 is the structure view of the recording/reproducing apparatus, according to one embodiment of the present invention.

FIG. 1 is a block diagram for showing the structure of the recording/reproducing apparatus, applying therein the multi-chip 1 of double-sided beam type, according to the present invention. In this FIG. 1, a double-sided beam 2 attaching or disposing a multi-chip at the center thereof is supported by a frame 3, which is provided in an upper portion thereof. And, the frame 3 can move into the horizontal directions in parallel to an XY stage, on which the recording medium 102 is fixed, by means of an XY scanner 5 provided in an upper portion thereof, and also into the vertical direction by means of a Z-axis scanner 6. Also, on every corner (i.e., at the four (4) corners) of the frame 3 for supporting the double-sided beam 2 thereon, on an upper portion thereof, there are provided PZTs (Piezoelectric elements) 7, so that a frame assembly 3' is controlled to be in parallel with the recording medium 102, in the structure thereof. For the purpose of keeping the degree of parallelization between the frame assembly 3' and the recording medium 102, electrostatic capacity sensors 8 are provided on the four (4) corners of the frame assembly 3'.

With this, check is made always upon the degree of parallelization between the frame assembly 3' and the recording medium 102, and thereby controlling the degree of parallelization to be within a certain value thereof, with providing signals to the PZTs 7 by means of a PZT controller 9.

Also, with the scanners of the XY directions and the Z direction provided on the upper portion thereof, there is provided a scanner controller (i.e., a positioning drive controller circuit) 10, for purpose of obtaining the positioning thereof at high accuracy; thereby, driving or moving them, slightly. On the other hand, for the XY stage 4 at the lower side where the recording medium is to be fixed, there is provided a stage controller 11, which is able to move the recording medium into the XY directions, respectively. Thus, it has the structure that the recording medium can be moved widely in the range thereof, comparing to that of the scanner. However, in case when being applied into an actual product, it is preferable to make the positioning, accurately, with using either one of the movable mechanisms, which are provided at the upper and the lower portions, for the purpose of lowering the costs thereof.

Also, for the multi-chip 1 of double-sided beam type, there are provided a voltage applying (R/W) circuit 12, for performing the recording/reproducing of information through applying voltage and running current therethrough, and also a signal processor circuit 13, for processing the information read out from the circuit as a signal; thereby, enabling to perform the signal processing of large amount or quantity thereof, at high speed. Those circuits may be constructed in the form of a circuit element(s) when being mounted into the product.

Figure 2:
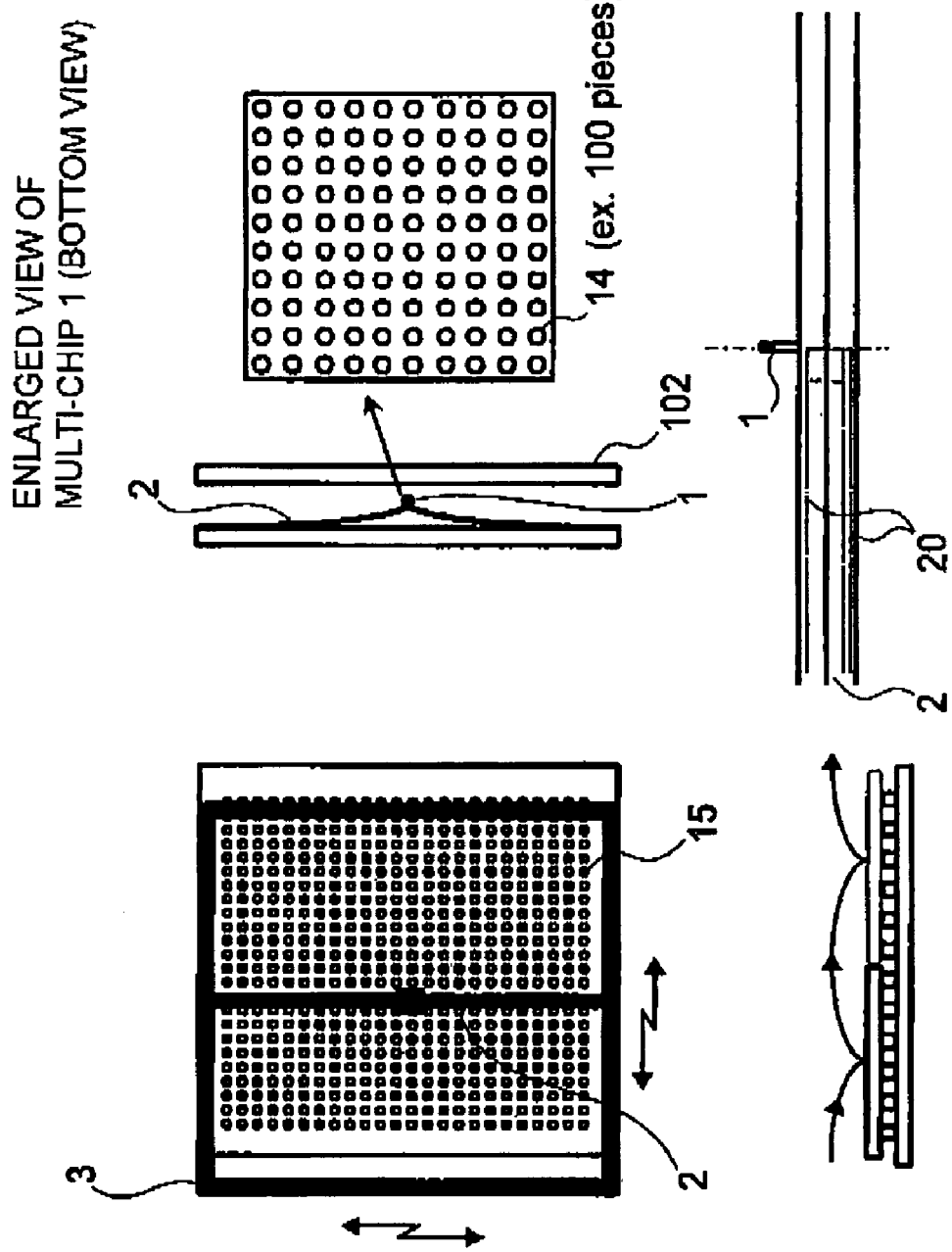
FIG. 2 is an explanatory view for showing the structures of a multi-chip and a double-sided beam, and a frame, according to the present invention.
Figure 3:
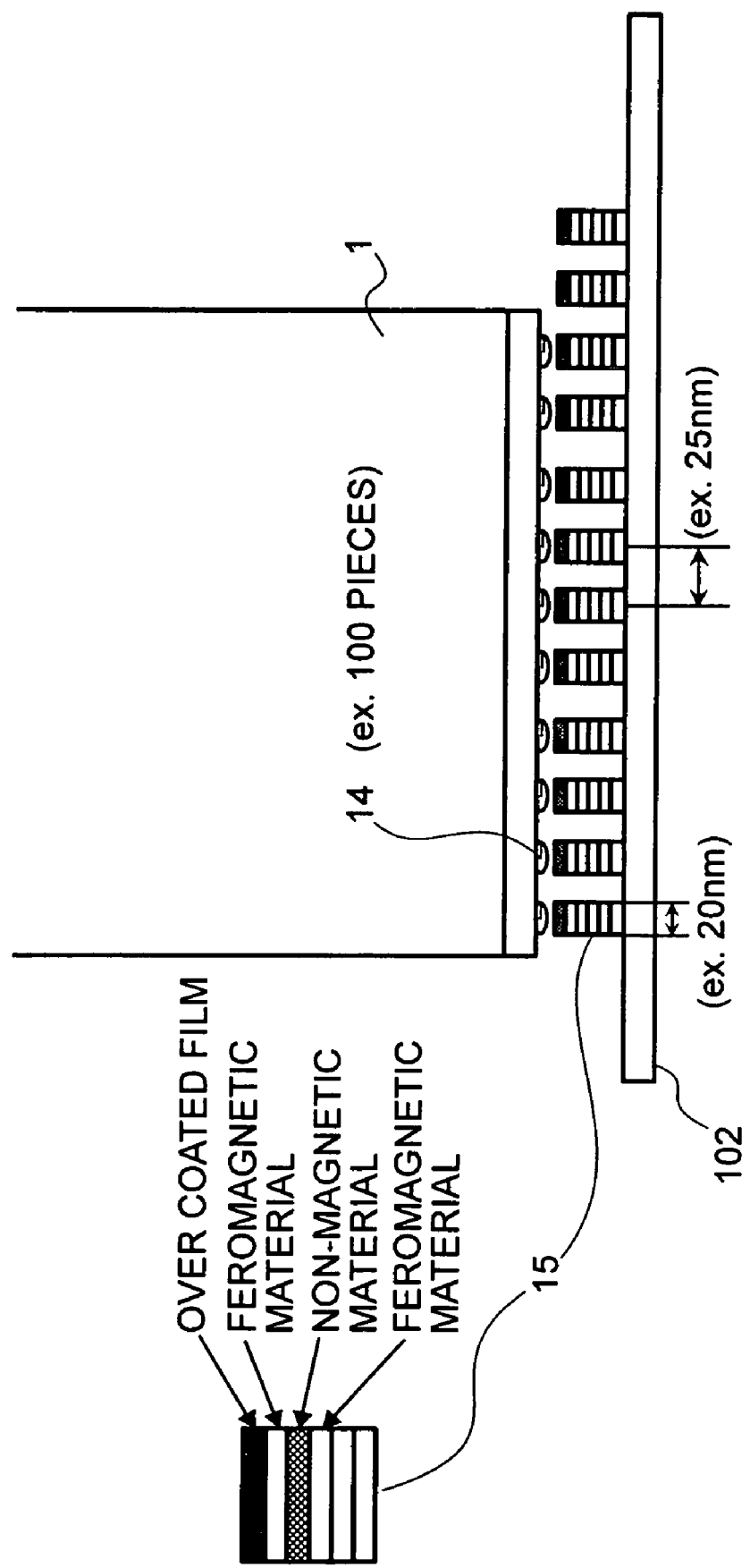
FIG. 3 is an explanatory view for showing the contact condition between the multi-chip and a recording medium, according to the present invention.

Next, explanation will be made about the structure of the multi-chip 1 of double-sided beam type, according to the present invention. FIG. 2 shows a double-sided beam 2 of the double-sided beam type multi-chip 1 and recording/reproducing portions 14 thereof. FIG. 3 shows the contacting condition between the double-sided beam type multi-chip 1 and the recording medium 102. The recording medium 102 is made up with recording dots 15 in plural numbers thereof, which are formed in the dot-like and are called by "pillar", as is shown in FIGS. 2 and 3, and with each of the recoding dots is in contact each of the recording/reproducing portions 14 formed on the multi-chip 1, one by one, so that current flows upon application of voltage thereto by means of the voltage applying (R/W) circuit 12; thereby, performing R(Read)/W (Write).

Each of the recording dots 15 is made up with a pillar of ferromagnetic material/non-magnetic material/ferromagnetic material below a coat film, as is shown in FIG. 3, for example, and the direction of magnetization is reversed on one side of the ferromagnetic materials, by conducting current in the vertical direction thereof. With using this phenomenon, the recording/reproducing is performed, and that phenomenon was already confirmed by experiments.

In FIG. 2, according to the present embodiment, there is shown the structure of the recording medium 102, having an area of 100×100 um squares, from/onto which one (1) piece of the double-sided beam type multi-cell 1 conducts R/W, exclusively. The one (1) piece of the double-sided beam 2 is able to move around within an area (i.e., 100×100 um squares), corresponding to a waiting area on the recording medium 102, by means of the XY scanner 5, which drives the frame 3 for supporting the double-sided beam 2 thereon. Also, in the direction of the Z-axis, it has the structure of being positioned at an appropriate position, with respect to the recording medium 102, by means of the Z-axis scanner 6. At the center of the double-sided beam 2 is the built up the multi-chip 1 having the recording/reproducing portions 14 in large numbers thereof (for example, 100 pieces in the present embodiment), and therefore each of the recording/reproducing portions 14 is in contact with each of the recording dots 15 on the recording medium, respectively, corresponding to one by one.

As is shown in FIG. 3, the multi-chip 1 moves due to the suction force towards a side of the recording medium through deformation of the double-sided beam 2, so that current flows through, under the condition where each of the recording/reproducing portions 14 is in contact with each of the recording dots 15 formed on the recording medium 102, respectively, corresponding to one by one, or under the non-contact condition, but floating above a very little bit; therefore, the information can be recorded onto the each recording dot 15. Reproducing thereof is also performed in the similar manner or method. In this manner, since they make up or establish so-called the multi-points contact when the plural numbers of chips (i.e., the plural numbers of recording/reproducing portions 14 of one (1) multi-chip 1) come into contact with the plural numbers of recording dots 15, therefore they are in contact with each other, in stable and correctly, comparing to when a single chip comes into contact with one of the recording dots 15; thereby, improving the reliability of R/W of data.

Also, each of those recording dots 15 is electrically insulated from one another, completely, in the structures thereof As is shown in FIG. 3, a space may be disposed or defined between the respective dots (i.e., the dots neighboring to each other are disposed, being separated from each other), however, this gap portion (i.e., the separating portion) may be made of an insulating material, but it is still possible to obtain the similar effect thereof. With adoption of such the structure, no electrical interference is generated between the respective recording dots, with each other; therefore, there can be obtain an advantage that the distance between the dots can be made very small (i.e., being equal or smaller than 5 nm), comparing to that of the thermal recording method or the like, as well as, that disposition of the recording dots 15 at high density also increases the recording capacity thereof.

As was mentioned in the above, with changing the cantilever, which was constructed with a single chip up to now, into the multi-chip 1 of double-sided beam type, it is possible to read/write a large amount of information, at once, as well as, to reduce the traveling distance of the multi-chip down to 1/(number of the multi-chips), comparing to that of the single chip; therefore, an amount of the abrasion can be reduced, greatly, at the recording/reproducing portion, as being the contact portion.

Figure 4:
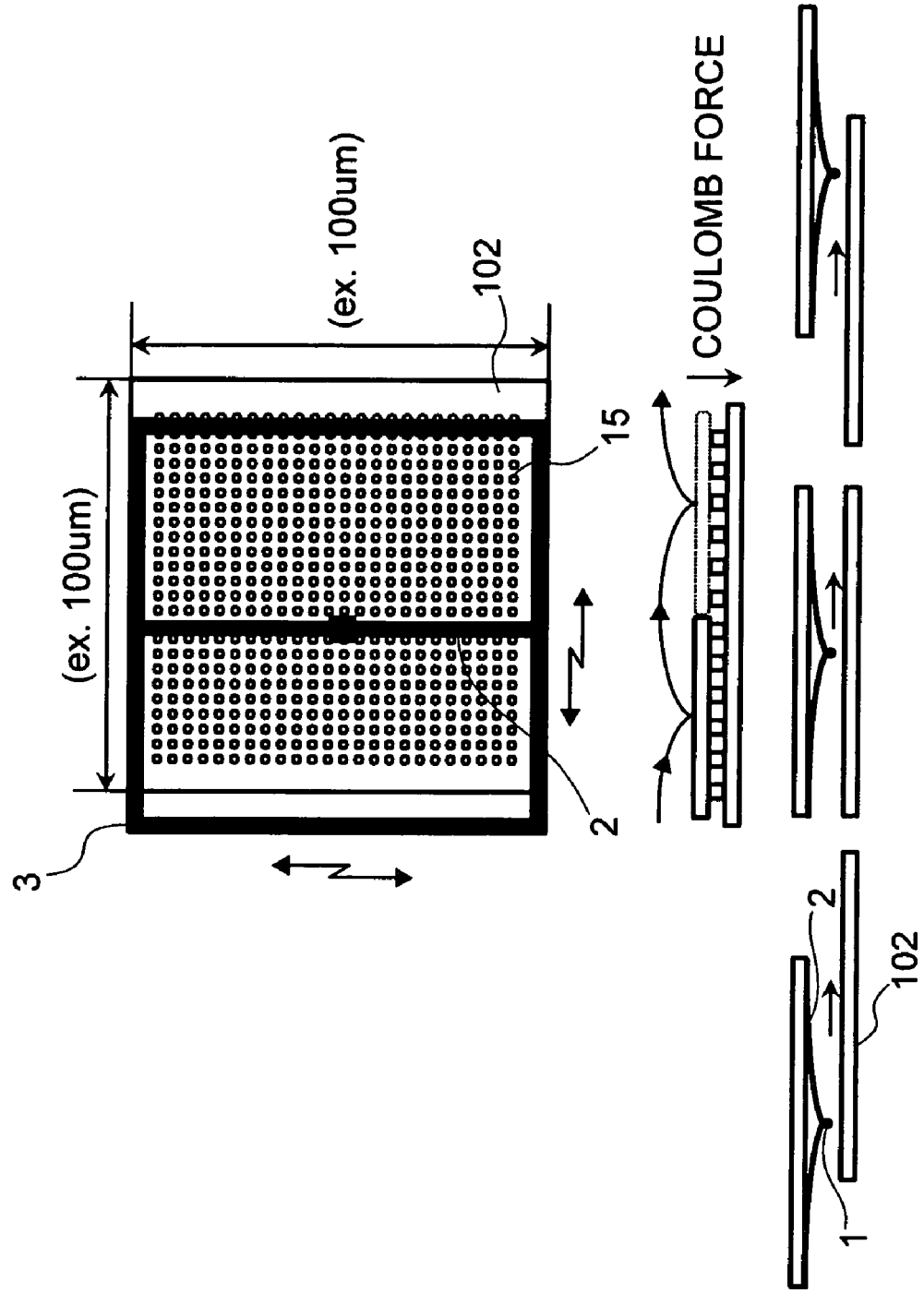
FIG. 4 is an explanatory view for showing the moving condition of the frame portion, according to the present invention.

Next, explanation will be given about a way, i.e., how the multi-chip 1 of double-sided beam type makes contact with the recording medium 102, for recording, and how it moves, by referring to FIG. 4. Upon the surface of each the double-sided beam 2, in particular, on the recoding medium side thereof is formed a metal thin-film. When applying voltage between the double-sided beam type multi-chip 1 and the recording medium, the suction force (i.e., the Coulomb force) is generated. Before conducting R/W, as is shown in FIG. 4, the multi-chip 1 and the recording medium are in the non-contact condition therebetween, so that the frame assembly 3' can move in the X and Y directions, freely. Next, when an instruction of R/W is given from a controller, the multi-chips 1 is positioned above desired data on the recording medium 102. And then, with application of the desired voltage, the double-sided beam 2 is sucked towards the side of the recording medium 102 due to the Coulomb force, and then the recording/reproducing portions 14 of the multi-chip 1 are in contact with the recording dots 15, respectively, corresponding to one by one. And thereafter, current flows from the voltage applying (R/W) circuit 12 to the recording/reproducing portions 14, thereby performing R/W. This suction force (i.e., the Coulomb force) can be calculated out, from the mass of the double-sided beam 2 and the spring constant, etc. Therefore, it is possible to control the voltage so that the pressure when contacting comes to be very small, and thereby reducing the abrasion when contacting. Also, when moving into the X and Y directions after completing the R/W, the multi-chip portion 1 is moved, after falling into the non-contact condition with the recording medium, once, by turning the Coulomb force into OFF. In this manner, movement of the multi-chip 1 under the non-contact condition further enables to reduce the abrasion. Also, with setting or determining the curvature radius to be equal or greater than 50 nm, at the tip of the recording/reproaching portion 14 of the multi-chip 1, then the contact area comes to be large, so that the pressure can be dispersed away, and therefore the abrasion is further reduced comparing to the chip of the conventional art.

Figure 5:
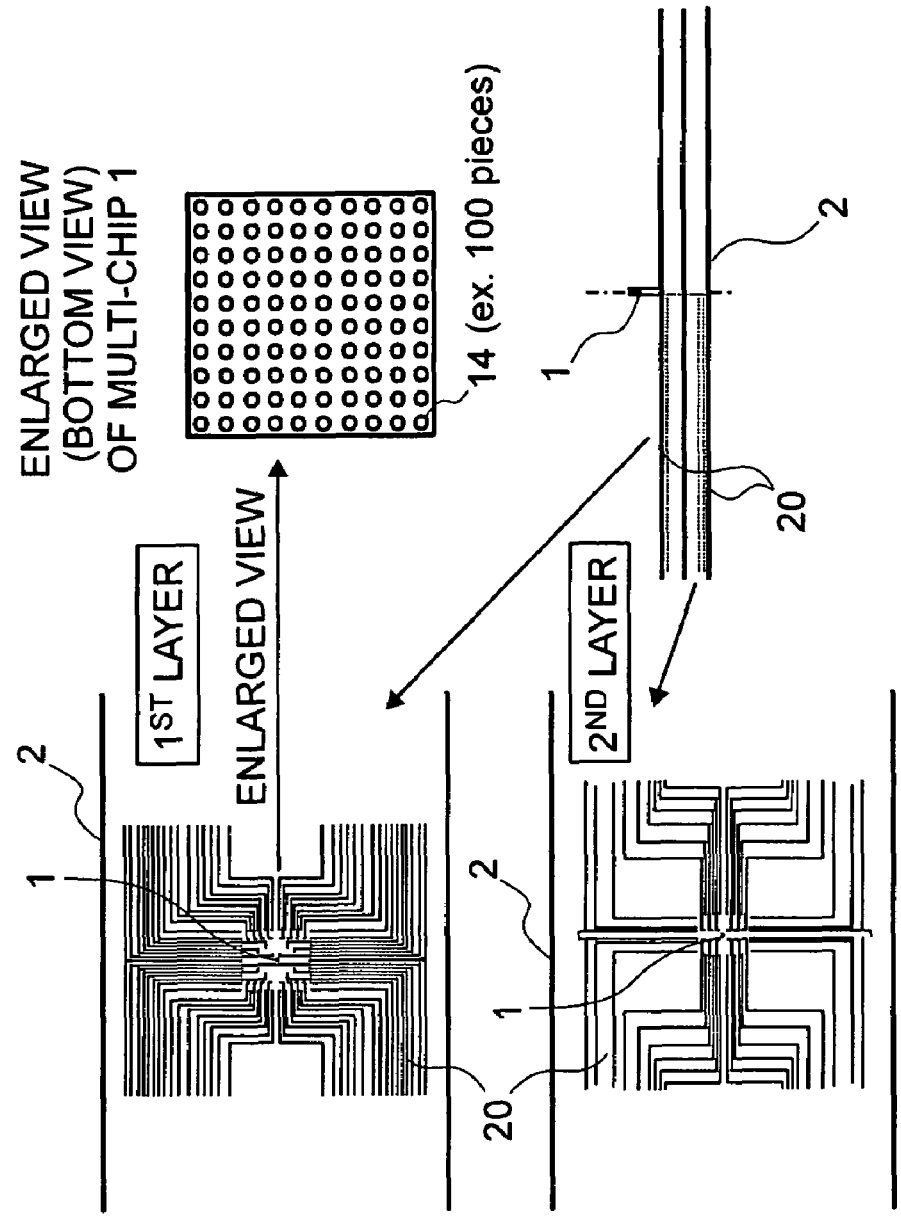
FIG. 5 is an explanatory view for showing wirings on the double-sided beam of the multi-chip, according to the present invention.
Figure 6:
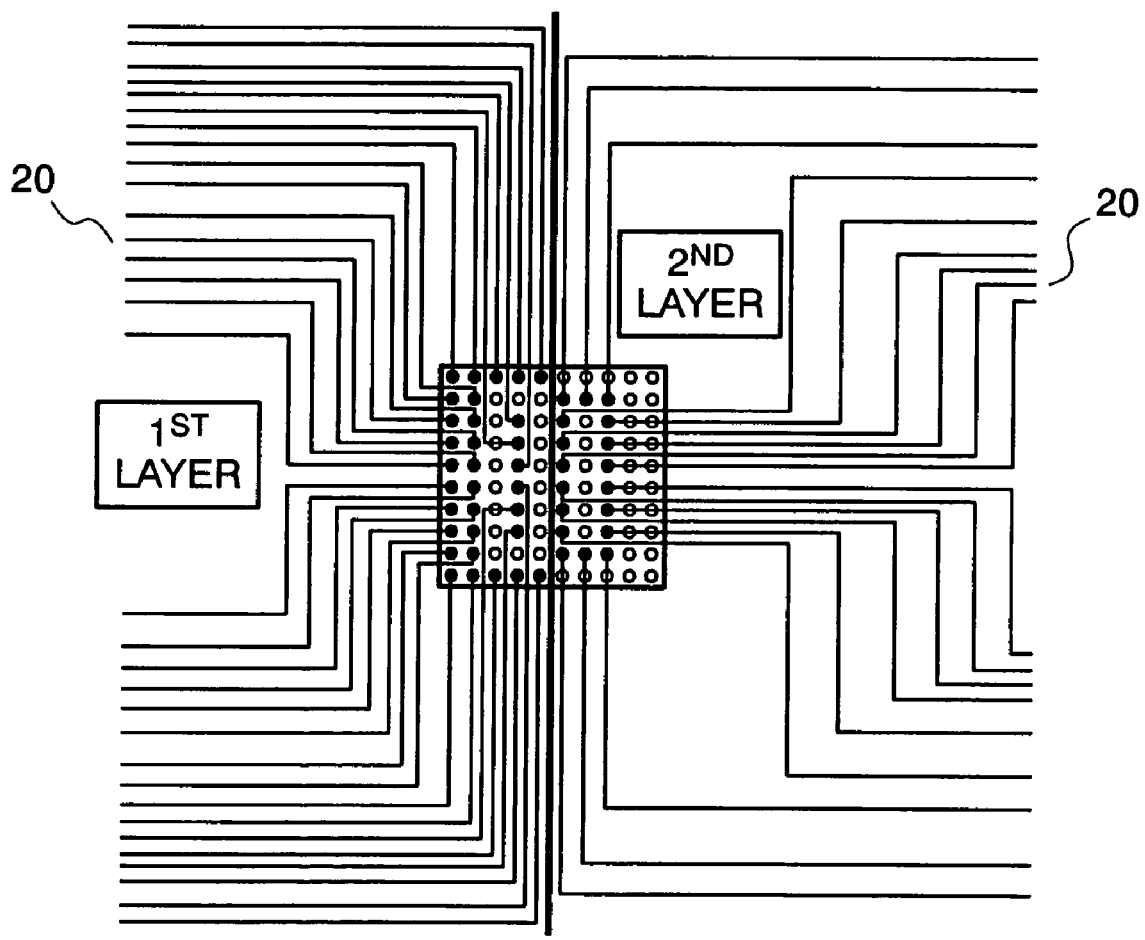
FIG. 6 is an explanatory view for showing the wirings of the multi-chip, according to the present invention.

The details of the double-sided beam type multi-chip 1 will be explained, by referring to FIG. 5. As is shown in FIG. 5, the multi-chip 1 is located at a center of the double-sided beam 2, and on the surface of that multi-chip 1 are formed the recording/reproducing portions 14, each of which is formed through coating of a noble metal, such as, Pt, Pt—Ir or the like, or an alloy thereof, etc. And also, the recording/reproducing portions 14 in the case of 100 pieces thereof, for example, as is shown in FIG. 6, they are connected to wirings 20 of two-layers, respectively. Those wirings 20 are formed in an interior or on a surface of the double-sided beam 2 on the rear surface of the multi-chip 1 shown in FIG. 5, in the form of the two-layers, and each of the wirings reaches to the frame 3 shown in FIG. 3, passing through the interior or the surface of the beam 2.

After being read out by the recording/reproducing portions 14, R/W signals are converted into a bit signal through a signal processor circuit 13, which is provided in an upper portion of the frame 3, thereby to be processed. The double-sided beam 2, the wirings 20 and the multi-chip 1 are formed with using the semiconductor processing technologies, such as, etching, evaporation, etc. As the insulating material of the layers, to be buried into the gap defined between the recording/reproducing portions, the followings can be considered; for example, silicon nitride, silicon oxide, and diamond, etc.

Next, explanation will be given about the manufacturing method of the double-sided beam type multi-chip 1 and the double-sided beam 2, by referring to FIGS. 7(a) to 7(h).

Figure 7A:
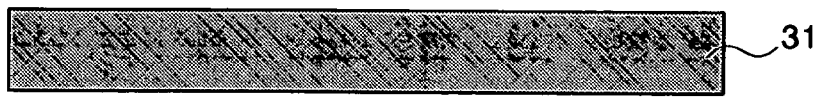
FIGS. 7(a) to 7(h) are views for showing steps of a manufacturing method of the double-sided beam, according to the present invention.
Figure 7B:
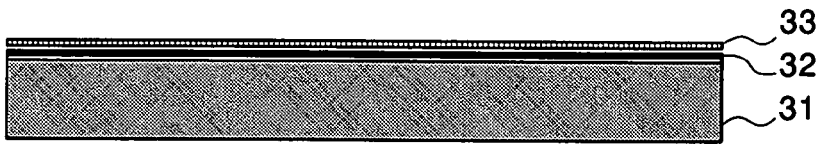
Figure 7C:
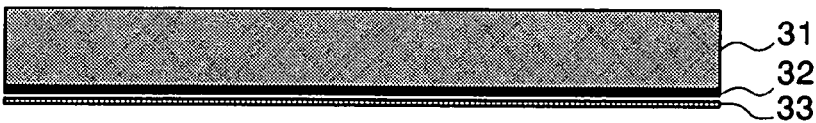
Figure 7D:
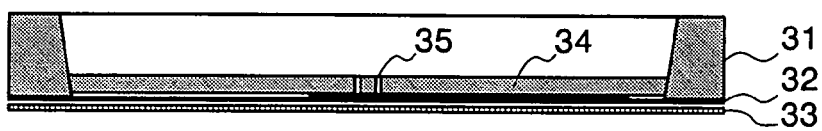

First of all, Si wafer 31 is prepared (see, FIG. 7(a)).

Next, on the surface (on the main surface) of the Si wafer 31 is formed a resist & metal film 32, and drawing of the wirings of the second layer shown in FIG. 6 is made, by using a lithography (direct drawing) method, such as, EB, FIB or the like, for example. Thereafter, a film or layer 33 of silicon oxide ($SiO_2$) is formed through spattering or the like (see, FIG. 7(b)).

Next, the Si wafer 31, on which the silicon oxide film 33 is formed, is turned upside down, to be processed with the etching or the like upon the rear surface thereof (i.e., the reverse side surface opposite to the main surface); thereby, forming the double-sided beam having a desired thickness (ex. 3 um). (see FIG. 7(c)). Further, through the etching, a through-hole 35 is formed in the beam portion 34, to be filled up with a metal therein, through an electrolytic plating method, etc., for example, and then a film is formed, for connecting the tip of the multi-chip 1 and the wiring 20 (see, FIG. 7(d)).

Figure 7E:
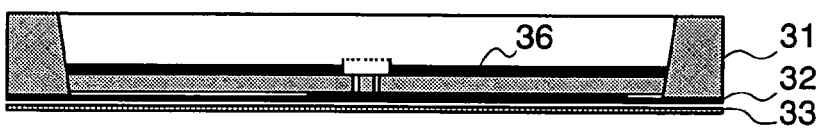

Next, the resist & metal film 36 is formed on the surface of the beam portion 34, again, and the wiring 20 of the first layer shown in FIG. 6 is drawn thereon (see, FIG. 7(e)).

Figure 7F:
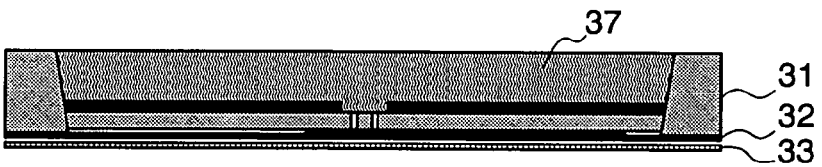

Next, after drawing of the wiring, upon an upper portion thereof is formed a film 37 of silicon oxide ($SiO_2$), through the spattering, etc., (see, FIG. 7(f)).

Figure 7G:
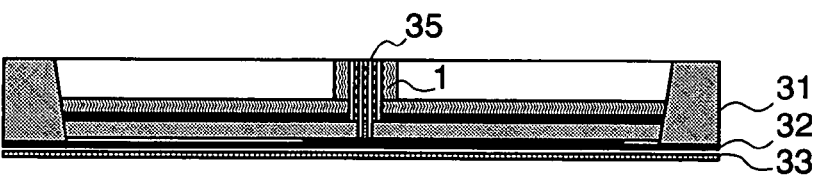

Next, through the etching is formed or made up the multi-chip portion 1, and thereafter the through holes 35 are formed for connecting between the tip portion of the chip and the wirings (see, FIG. 7(g)).

Figure 7H:
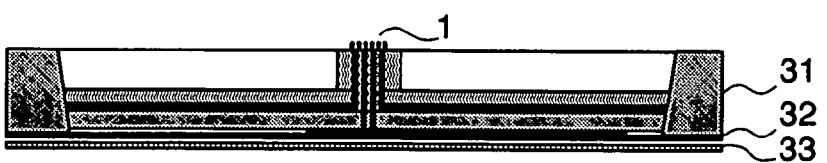

Next, the metal for the wirings (i.e., the first layer and the second layer) shown in FIG. 6 is buried or filled up within the through holes 35, through the electrolytic plating method, etc., as well as, forming films, and at the last, a noble metal, such as, Pt, etc., is coated at the tip portion (see, FIG. 7(h)). Thereafter, polishing is made on the surface of the multi-chip 1, for the purpose of reducing the abrasion, but depending on the necessity thereof.

Figure 8:
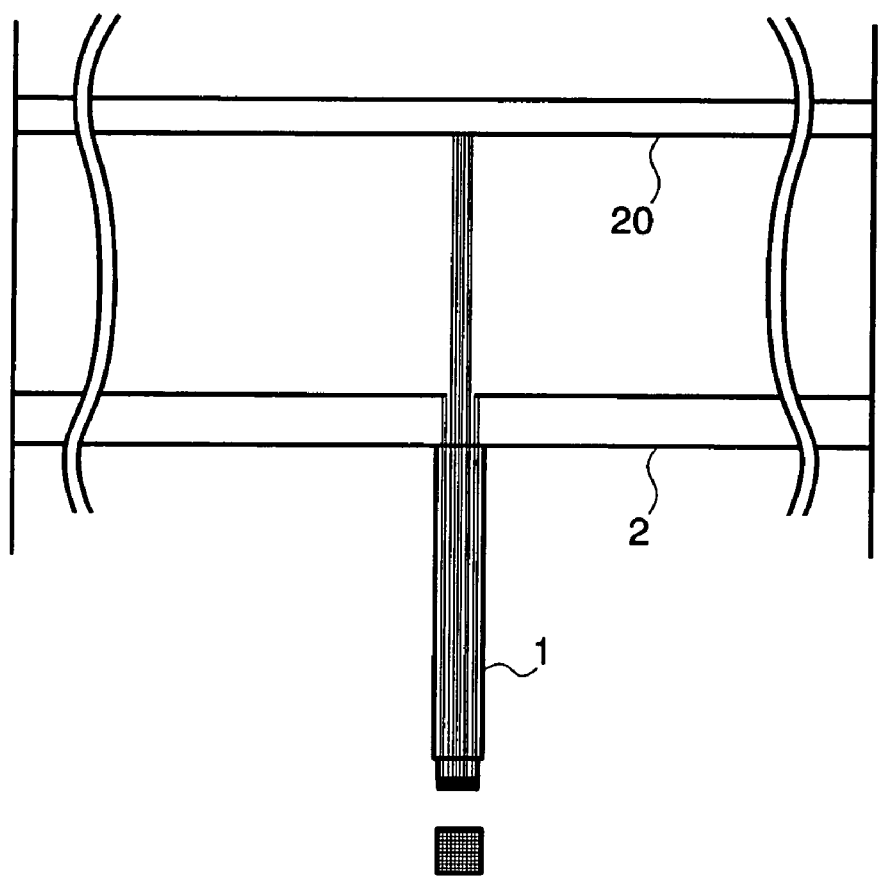
FIG. 8 is an enlarged cross-section view of the double-sided beam, according to the present invention.
Figure 9A:
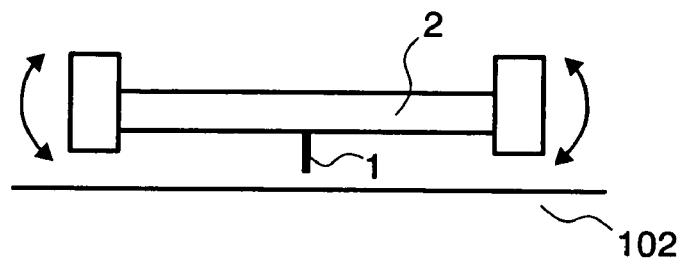
FIGS. 9(a) to 9(c) are views for showing the contact due to height and inclination of the multi-chip, according to the present invention.
Figure 9B:
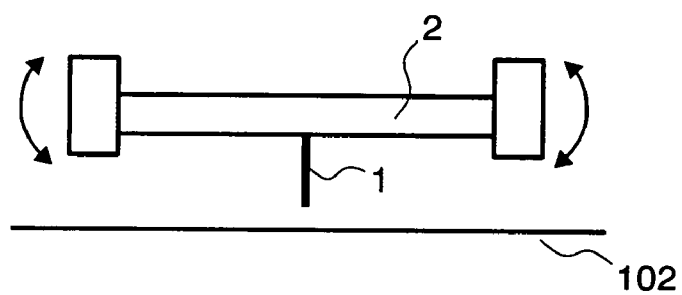
Figure 9C:
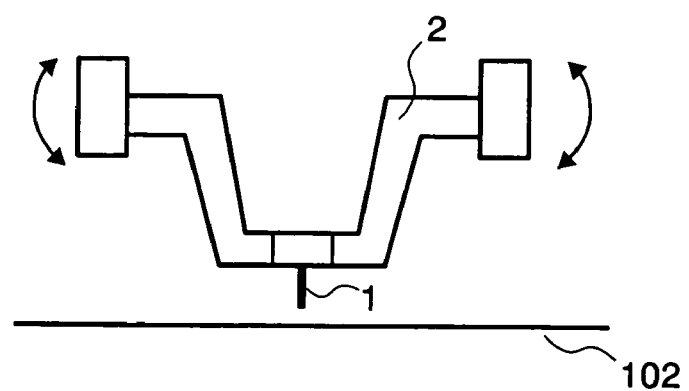
Figure 10:
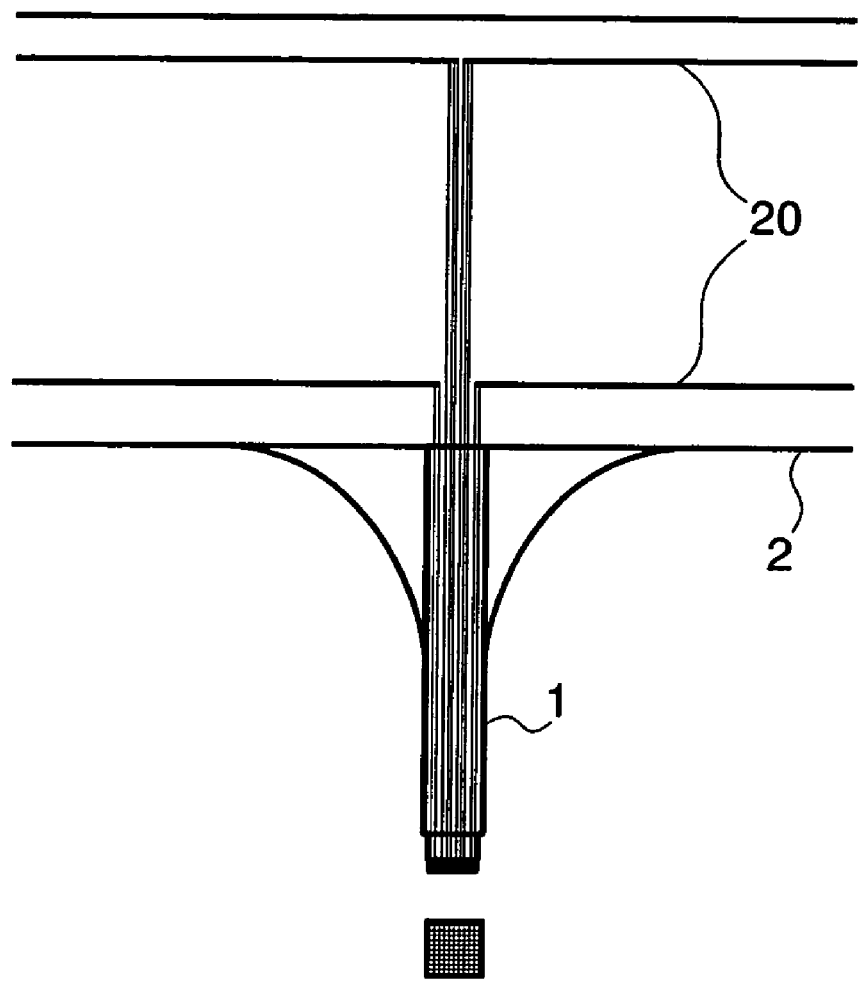
FIG. 10 is an enlarged cross-section view of the structure, with which the strength of the double-sided beam is enhanced, according to the present invention.

Next, an enlarged cross-section view of the multi-chip 1 and the double-sided beam 2 is shown in FIG. 8. The wirings 20 can be seen within an inside of the double-sided beam 2. In this FIG. 8, a height of the multi-chip is about 3 um; thus, being long or high, comparing to an area (ex. 0.26 um square) of the multi-chip 1. A reason of this height lies in that, if the height of the multi-chip 1 is low, as is shown in FIG. 9(a), there is a possibility that, even due to a very small inclination of the double-sided beam 2, both end portions of the beam 2 come into contact with the recording medium 102 before the multi-chip 1 comes in contact with it. For this reason, as is shown in FIG. 9(b), for the multi-chip 1, it is necessary to have the height, being equal or greater than a certain value. However, if forming the double-sided beam 2 into a two-step form, as is shown in FIG. 9(c), it is possible to bring the height of the multi-chip to be low; thereby, enabling it to be manufactured, easily, while keeping it difficult to be bent. Also, as is shown in FIG. 10, it is also possible to increase the strength of the multi-chip 1, when forming it to be thick at a portion of the root or base thereof.

Figure 11:
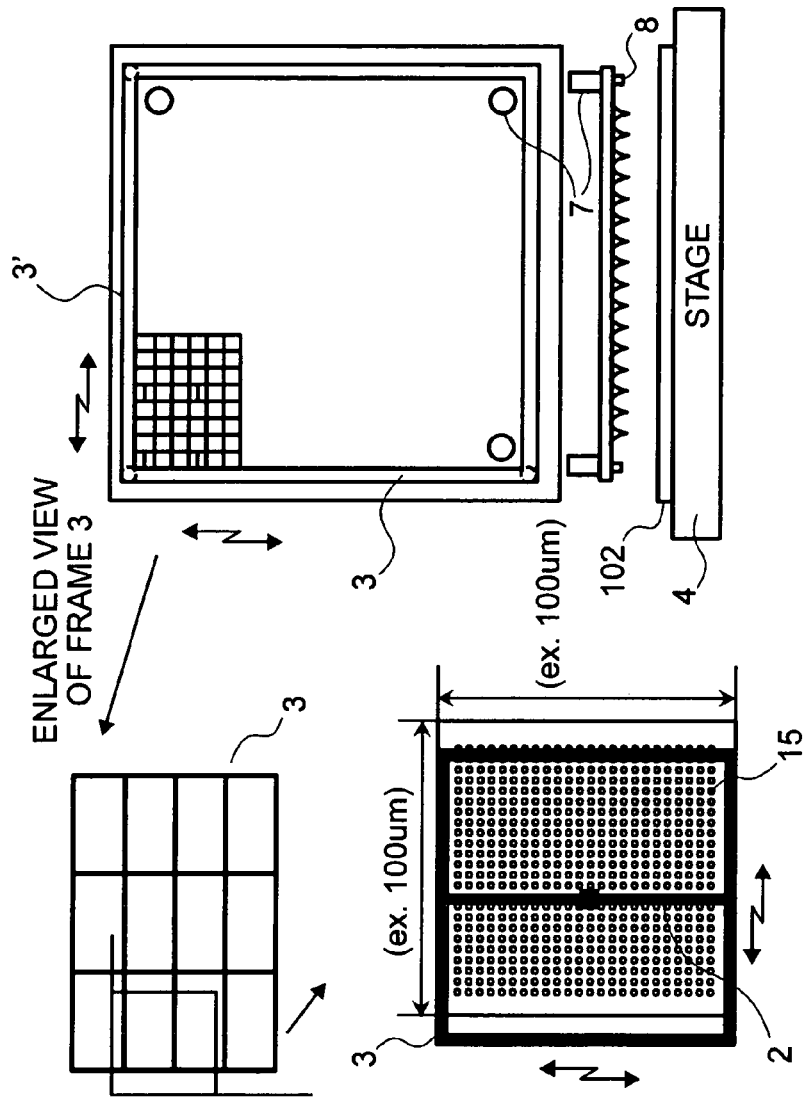
FIG. 11 is an explanatory view for showing the structure of a frame assembly, according to the present invention.

Next, FIG. 11 shows the structures of each of the frames 3, on each of which is provided the double-sided beam type multi-chip 1 mentioned above, respectively, the frame assembly 3', and the XY stage 4, onto which the recording medium 102 is fixed. The each frame 3 is made up to be 100 um squares, for example, and if assuming that the recording medium as a whole is 3.2 mm squares, then 32 pieces of the frames are aligned into the X and Y directions, each being 100 um×100 um squares. Accordingly, the total number of the assembly of the frames as a whole comes to 32×32=1,024 pieces, for each of which the double-sided beam 2 is made up. Thus, one (1) piece of the double-sided beam 2 is made up for each of the frames 3, and therefore at the central portion of each of the double-sided beams 2, there is provided the multi-chip 1 being attached with 100 pieces of the recording/reproducing portions thereon. When conducting R/W with using this double-sided beam type multi-chip 1, then an amount of data, which can be processed at one time, comes up to 1,024× 100≈0.1 Mb. This means that 100 times amounts of data can be processed at one time, comparing to when the R/W is conducted only by one (1) piece of cantilever, and also 100 times high on the transfer speed thereof. Also, in the case of the multi-chip 1, since 100 pieces of data can be R/W at one time, then the traveling distance on the surface of the recording medium 102 comes down to $\frac{1}{100}$, comparing to that of the cantilever of the single chip, and therefore an amount of abrasion can be reduced, remarkably.

Further, as other embodiment, with provision of the double-sided beams 2 in plural numbers thereof, each being attached with the multi-chip 1 thereon, for example, so as to achieve the simultaneous transmission, it is also possible to increase the transfer speed, further.

Figure 12:
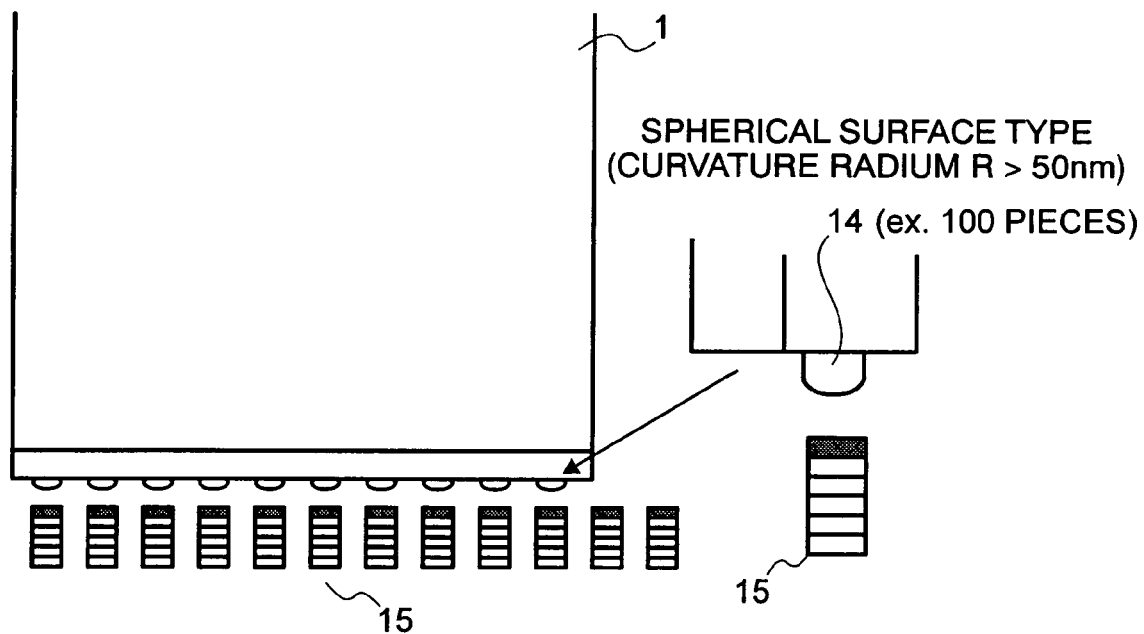
FIG. 12 is an explanatory view for showing the configuration of a tip of the recording/reproducing portion of the multi-chip, according to the present invention.

Also, because the recording/reproducing apparatus of the conventional cantilever method has a beam of the cantilever type, and also the contact comes into the point contact between the chip surface and the surface of the recording medium, therefore the abrasion can proceed, easily. According to the double-sided beam type multi-chip 1, the contact between the multi-chip and the surface of the recording medium comes to be near so-called the plane or surface contact due to the double-sided beam type; therefore with this, the abrasion can be reduced. However, in such the instance, it is necessary to shape an end or edge of the chip to be enlarged in the contact area thereof. For that purpose, it is important to form a sharp edge of the chip into a spherical surface type, having a large curvature radius at the end (ex. R>50 nm), as shown in FIG. 12, and also to form the recording/reproducing portion 14 to have a surface area, being equal or less than that of the recording dot 15, so that it does not contact with the neighboring recording dots in the vicinity thereof.

Also, as was mentioned previously, electrostatic capacity sensors 8 are provided on every corner of the frame 3, which is positioned to be in parallel with the surface of the recording medium 102, on a surface opposing to the surface of the recording medium 102, each changing the capacity depending upon the distance between the recording medium 102 and the frame 3; i.e., building up the structure for controlling the degree of parallelization between the surface of the recording medium 102 and the frame 3, through changing the position of the PZTs 7 provided on the upper portion of the frame 3, so that the respective capacitances come to be coincident with one another, at least three (3) points thereof. Also, the frame 3 can be moved by means of the XY and Z scanners 5 and 6, which are provided on the upper portion of the PZTs, and if it moves by 100 um in the X and Y directions, then it is able to read/write all of data on the surface of the recording medium.

Next, FIG. 13 shows the signal processor circuit 13, which is provided on the upper portion of the double-sided beam 2.

Figure 13C:
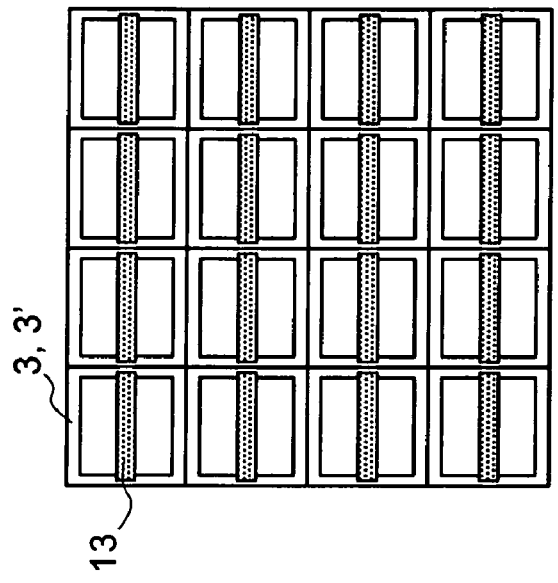
FIGS. 13(a) to 13(d) are explanatory views for explaining a signal processor circuit, according to the present invention.
Figure 13B:
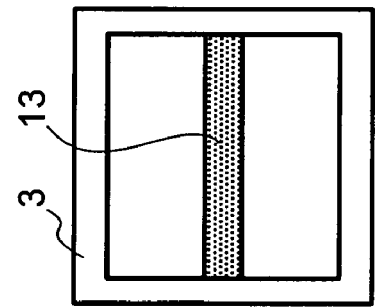
Figure 13A:
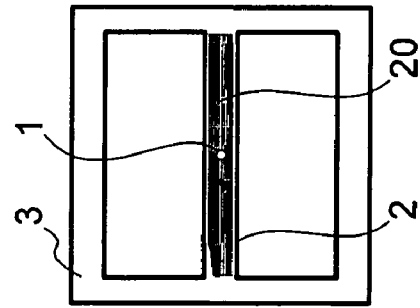
Figure 13D:
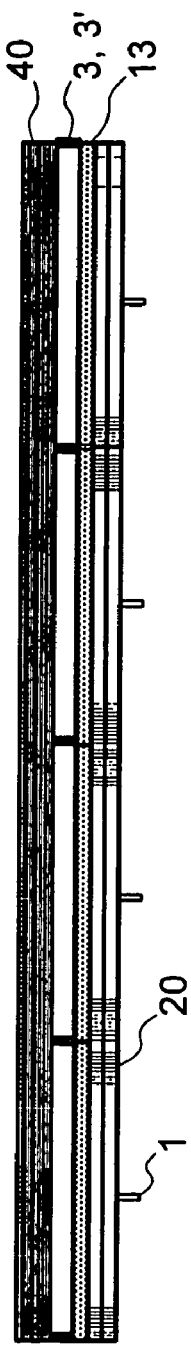

The R/W signal, which is used within the multi-chip 1 for conduction the recoding/reproducing or deletion of, etc., passes through the wirings 20 formed within the double-sided beam 2 (see, FIG. 13(a)), and is inputted into the signal processor circuit 13, which is provided on the upper portion of the double-sided beam 2 (see, FIG. 13(b)). The R/W signals detected by the 100 pieces of recording/reproducing portions 14 are changed into a signal of 100 bits within the signal processor circuit 13 shown in FIG. 13(c), and it is transmitted to the voltage applying (R/W) circuit 12 shown in FIG. 1, propagating on the wirings formed on the frame assembly 3' shown in FIG. 13(d) and further passing through a supporting portion 40.

As was mentioned above, with the recording/reproducing apparatus according to the present invention, being provided with the multi-chip(s) of double-sided beam type, it is possible to rise up the transfer speed of data, but without increasing the number of pieces of the cantilevers. For example, if trying to obtain an effect similar to that of the present invention, for example, by increasing the number of pieces of the cantilevers, then 100 pieces of cantilevers are necessary to be built up within an area of 100 um squares. However, from the viewpoint of the state of the present technology, there is a problem to manufacture such the cantilever to be equal or less than 10 um in the size thereof and even if it is possible to increase the number thereof, but there is a limit of the number of the cantilevers that can be disposed within one (1) piece of the apparatus. Accordingly, it is difficult to rise up the processing speed of data to be higher than that. However, in the case of the multi-chip(s), it is possible to rise up the number of the chips, further, and thereby increasing the processing speed of data.

Also, as an effect other than that, if assuming that one (1) piece of the cantilever is provided per an area of 10 um squares, for example, 100 pieces of the cantilevers are necessity for an area or region of 100 um squares. In case when one piece thereof breaks down, the data of the region of 10 um squares (1%) cannot be read out/written into. However, in the case of the multi-chip(s), where there is one (1) pieces of a cantilever attached with 100 pieces of the multi-chips per 100 um squares, even if one piece of the chip thereof breaks down, but since the bit data can be read out by means of the other chips, as a whole thereof; therefore, reduction comes to be small in the rate of read-out of data.

Also, there is a possibility of generating the positional shift accompanying with elapse of time, such as, due to an increase of heat, etc., in the frame portion and/or the portion of the recording medium, for example. Also, in such the instance, compensation can made easily, since an amount of the thermal deformation is less when there is only one (1) piece of the cantilever, on which 100 pieces of multi-chips are provided, comparing to the case where there are provided 100 pieces of the cantilevers within the area of 100 um squares. In that instance, if installing the driving mechanism of the PZTs or the like into an inside of the double-sided beam 2, by making them into the form of the thin-film like, then it is possible to achieve the position control thereof.

Figure 14:
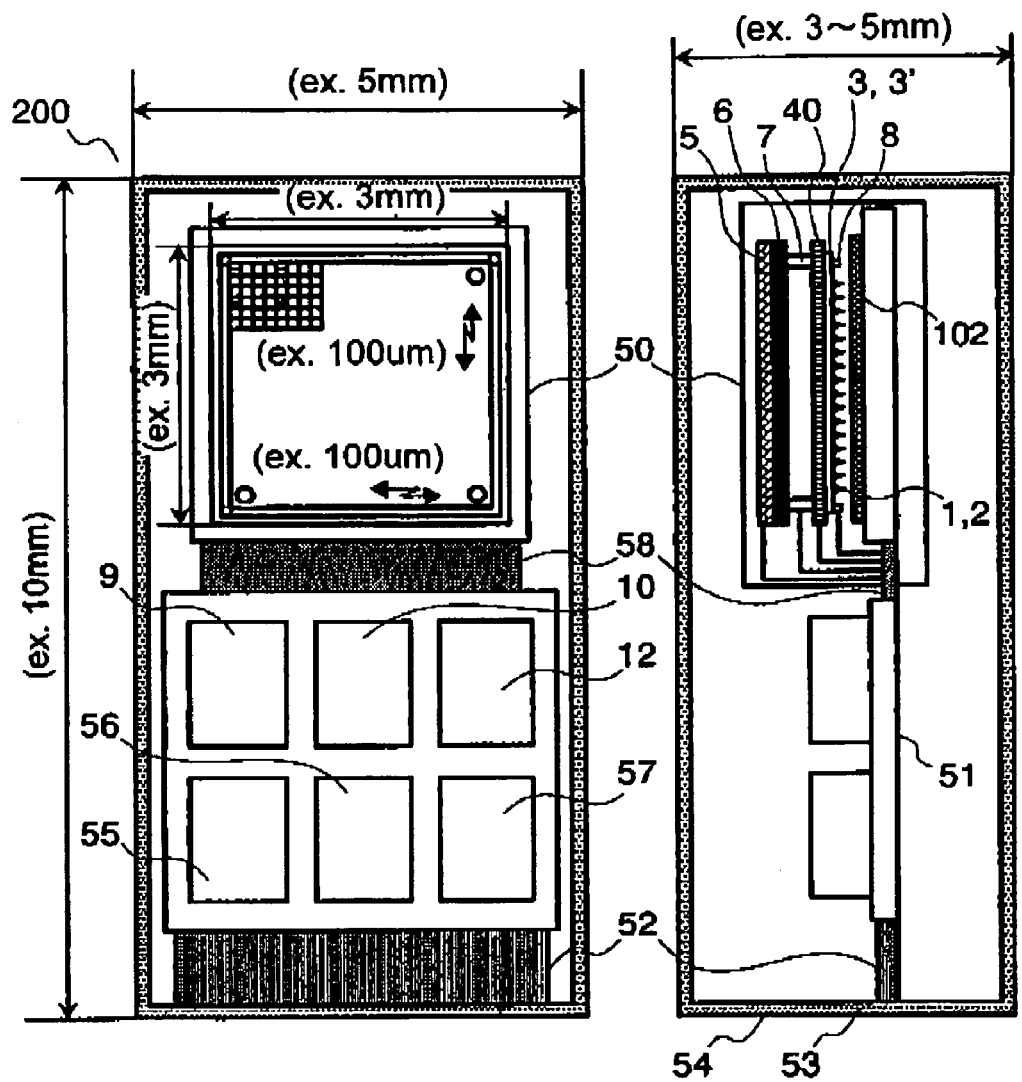
FIG. 14 is an explanatory view for showing the structure of the recording/reproducing apparatus, according to the present invention.

Lastly, an example is shown in FIG. 14, of the recording/reproducing apparatus 200, applying the multi-chips according to the present invention therein. In this FIG. 14, the recording/reproducing apparatus 200 is built up with a recording/reproducing unit 50, within which the multi-chips 1 according to the present invention are provided, a circuit board 51, on which a set of controller circuits are provided, a bus portion 52 including an interface between the recording/reproducing apparatus 200 and a computer (not shown in figures), etc., and a housing 54, being provided with a buffer material 53, as a protection layer, for protecting the above as a whole, from shock and/or vibration. The set of the controller circuits mentioned above is built up with, in addition to the scanner controller (i.e., the positioning and drive controller circuit) 10, the PZT controller 9, the voltage applying circuit (i.e., R/W circuit) 12, as was above-mentioned, a Coulomb force controller circuit 55, a parallelization degree detector circuit 56, an electric power source circuit 57, etc. The details thereof will be explained, below.

As was mentioned above, the recording/reproducing unit 50 is supported by the double-sided beam 2, at the center of which is attached the multi-chip, and the frame 3 of the upper portion thereof, so that the frame 3 moves in parallel with the recording medium 102, by means of the XY scanner which is provided at the upper portion, and also it moves into the vertical direction by means of the Z-axis scanner 6. In the present embodiment, assuming that each one formed with the double-sided beam 2 has the region of 100 um squares, and those frames 3 are provided by 32 pieces thereof, aligning into both directions, the vertical direction and the horizontal direction; i.e., totally, 32×32=1,024 pieces. Therefore, according to the present embodiment, the frame assembly 3' is manufacture within a region about 3.2×3.2 um squares, and the recording/reproducing unit 50 is about 3.5×3.5 mm in the sizes thereof.

Also, in the structures thereof, on every corner are provided the PZTs 7, upon the upper portion of the frame 3 for supporting the double-sided beam 2, and the frame assembly 3' is controlled to be in parallel with the recording medium 102. For keeping the degree of parallelization between the frame assembly 3' and the recording medium 102, the electrostatic capacity sensors 8 are provided on every corner of the frame assembly 3'. Thus, the sensors always check the degree of parallelization between the frame assembly 3' and the recording medium 102, so that signals are outputted from the PZT controller 9 on the upper portion of the frame portion, thereby controlling the degree of parallelization to be a certain value or less than that.

The recording/reproducing unit 50 mentioned above is connected with the board 51, on which the one (1) set of controller circuits mentioned above are mounted, through a connector portion 58, so as to transmit the signals between each of the controller circuits. As such the controller circuits, there are provided the PZT controller 9 for driving the PZTs 7 mentioned above, the scanner controller (i.e., the positioning and drive controller circuit) 10 for driving the scanners 5 and 6 and for positioning them in the X and Y direction and also the Z direction, at high accuracy, the voltage applying (R/W) circuit 12 for performing the recording/reproducing of information, the Coulomb force controller circuit 55 for controlling the Coulomb force to bring the multi-chip 1 of the double-sided beam 2 to be in contact with the recording medium 102, the parallelization degree detector circuit 56 for detecting signals of the parallelization degree from the electrostatic capacity sensors 8, and the electric power source circuit for supplying electric power to the recording/reproducing unit 50 and the controller circuits, etc. Each circuit is integrated, and therefore is constructed with a very small chip. Also, the circuit board 51 mentioned above is connected with the bus portion 52 building up the interface between the computers (not shown in figures), etc., and has the structure of being detachable and portable, as the recording/reproducing apparatus. The recording/reproducing apparatus 200 is protected, as a whole thereof, through the buffer material 53, and therefore it has the structure to be protected against the shock and vibration thereupon. Also, for achieving the protection of data when it is carried out, there is also provided a safety apparatus (not shown in figures), such as, of fixing the frame assembly 3', etc. In the present embodiment, the sizes of the recording/reproducing apparatus 200, including the recording/reproducing unit 50 and the set of the controller circuits mentioned above therein, are 5×10 mm, approximately. Of course, the recording/reproducing apparatus applying the present invention therein should not be limited only to that size.

As was mentioned in the above, the recording/reproducing apparatus 200 according to the present invention, though only having the sizes 5×10 mm, approximately, as a whole thereof, but can achieve high capacity, compactness, as well as, the high transfer speed, and further with provision of the present recording/reproducing apparatuses in plural numbers thereof, it is possible to provide the recording/reproducing apparatus, which further enables to achieve further large capacity thereof.

The effects obtainable from the representative ones of the present invention, which is disclosed by the present application, are as follows:

According to the present invention, the multi-chip is formed disposing the recording/reproducing portions (i.e., the chips) in plural numbers thereof at the tip of the cantilever, while the said cantilever is of the double-sided beam type, and the said multi-chip is disposed at the center of the beam, and the recording/reproducing portions of the said multi-chip are disposed corresponding to the said recording dots, one by one, wherein the multi-chip forming surface is moved up and down due to the Coulomb force, etc., so as to move in parallel with the recording surface, thereby brining the respective recording/reproducing portions to be in contact with the recording dots corresponding thereto, and electricity is conducted after the contact thereof, so as to conduct the recording, in the structures thereof; i.e., R/W of a large amount of data can be achieved, at one time, and therefore it is possible to improve the data transfer speed.

Also, with conducting the R/W by means of the multi-chip, comparing to the single chip, it is possible to reduce the traveling distance of the multi-chip, thereby to reduce the abrasion.

Also, since the tip portion of the said chip has the curvature radius, being large, such as, equal to 50 nm or greater than that, and since it moves in parallel with the surface of the recording medium, it can be in contact with the surface under the condition of, not the point contact, but near to the plane contact, therefore, the abrasion can be further reduced, effectively.

Also, with determination of the Coulomb force mentioned above to be appropriate, depending upon the spring constant of the each cantilever, it is possible to set the pressure applied between the tip portion of the chip and the tip portion of the dot; thereby enabling to reduce the abrasion, further effectively.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A recording/reproducing apparatus, for recording information on a recording medium, comprising: a double-sided beam type probe having a double-sided beam thereon, wherein a chip is formed at the center of the double-sided beam, wherein said chip is a multi-chip, on which plural numbers of conductive recording/reproducing portions are provided.

2. The recording/reproducing apparatus, as described in the claim 1, wherein said multi-chip has two or more of layers of wiring; and
    said double-sided beam has wiring on either one of a surface and an inside thereof.

3. The recording/reproducing apparatus, as described in the claim 1, wherein said recording medium is made from a plurality of recording dots which are electrically insulated from each other and are each comprised of a pillar of multi-layer films of ferromagnetic material/non-magnetic material/ferromagnetic material.

4. The recording/reproducing apparatus, as described in the claim 1, wherein each tip of said recording/reproducing portions, which are provided on said multi-chip in plural numbers thereof, is formed to be a spherical surface, being equal or greater than 50 nm of a curvature radius, and has an area being equal or less than a surface area of a recording dot.

5. The recording/reproducing apparatus, as described in the claim 1, wherein said probe is supported on a frame, which is constructed to be in a shape of rectangular, while a grid-like frame assembly of positioning said frames in plural numbers thereof has a structure to be disposed on an opposite surface of a surface of said recording medium, and a degree of parallelization of said frame assembly and the surface of said recording medium is detected by means of sensors, which are provided at four (4) corners of said frame assembly.

6. The recording/reproducing apparatus, as described in the claim 5, wherein said frame assembly is supported by expansible members at upper four (4) corners thereof, and the degree of parallelization of said frame assembly and the surface of said recording medium is controlled by controlling said expansible members through either one of voltage and current thereto.

7. The recording/reproducing apparatus, as described in the claim 6, wherein either one of said frame assembly and said recording medium is supported by means of an XYZ scanner, which is movable in vertical and horizontal directions.

8. The recording/reproducing apparatus, as described in the claim 1, wherein a metal thin-film is formed on the arm portion of said probe, to generate a suction force through application of voltage between said probe and said recording medium, so as to bring the recording/reproducing portions of said multi-chip in contact with recording dots of said recording medium, corresponding one by one, thereby recording/reproducing the information thereof.

9. The recording/reproducing apparatus, as described in the claim 8, wherein said multi-chip formed on said probe is removed with said suction force when it moves on the frame, so that it moves under a condition of being in non-contact.

10. The recording/reproducing apparatus, as described in the claim 1, further comprising one set of said double-sided beam type probe having said multi-chip and said frame assembly supporting said probe, said XYZ scanner for stopping said multi-chip at a predetermined position of the recording medium, and moving said frame assembly supporting said probe for reading/writing, so as to position the frame assembly at a predetermined position, said sensors for detecting the degree of parallelization between said frame assembly and said recording media, a recording/reproducing unit made up with a PZT for adjusting the degree of said parallelization by operating said frame assembly, and a controller circuit for controlling a recording/reproducing unit.

* * * * *